R. SCHOPF.
PIPE LIFTING CLUTCH.
APPLICATION FILED JAN. 15, 1909.
992,070.
Patented May 9, 1911.
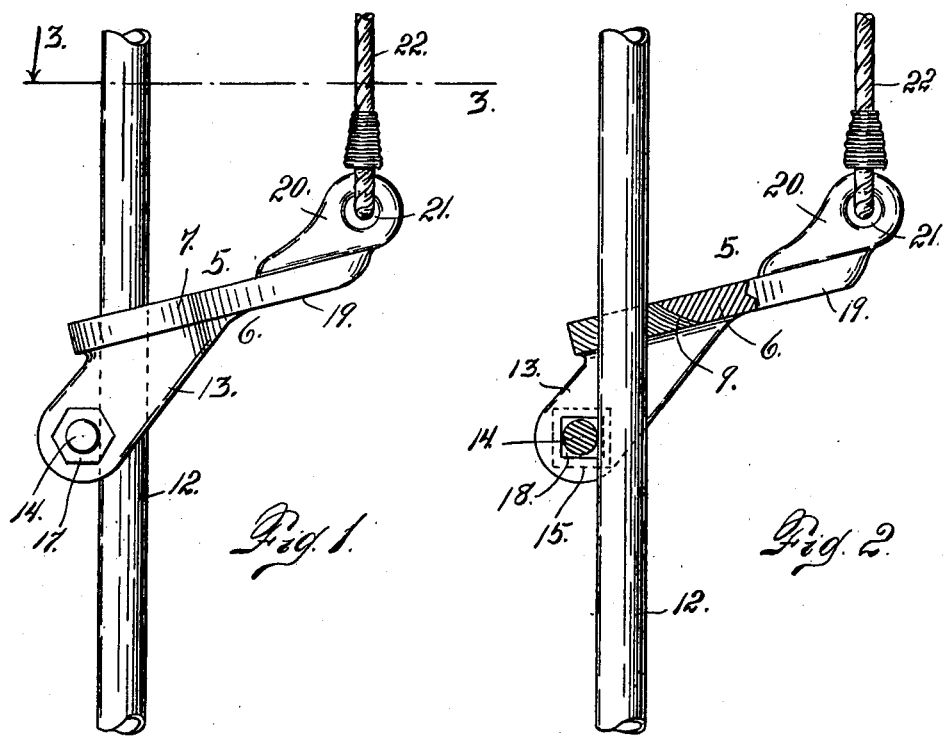
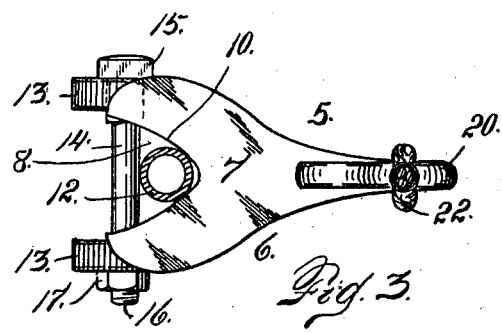
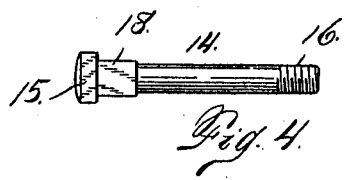

UNITED STATES PATENT OFFICE.

ROCHUS SCHOPF, OF ELIZABETH, COLORADO.

PIPE-LIFTING CLUTCH.

992,070. Specification of Letters Patent. Patented May 9, 1911.

Application filed January 15, 1909. Serial No. 472,453.

*To all whom it may concern:*

Be it known that I, ROCHUS SCHOPF, a citizen of the United States, residing at Elizabeth, county of Elbert, and State of Colorado, have invented certain new and useful Improvements in Pipe-Lifting Clutches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in means for lifting pipes or tubes, being more especially adapted for use where pipes of considerable length are to be handled, either raised or lowered, as in wells, mining shafts, and wherever it is necessary to perform this work.

My improved device is so constructed that when a pipe or tube is passed therethrough, the device will grip the same and maintain its hold thereon during the raising or lowering of the pipe, through the medium of a rope or cable connected with one extremity of the clutch.

Having briefly outlined my improved construction, I will proceed to describe the same in detail, reference being made to the accompanying drawing in which is illustrated an embodiment thereof.

In this drawing, Figure 1 is a side elevation of my improved device illustrating the same in use. Fig. 2 is a side view with the pipe clutch shown partly in section. Fig. 3 is a section taken on the line 3—3, Fig. 1, looking downwardly. Fig. 4 is a detail view of the bolt or pin forming a part of my improved device.

The same reference characters indicate the same parts in all the views.

Let the numeral 5 designate the clutch considered in its entirety, the same being composed of a body part 6 whose forward extremity is widest, as shown at 7, and provided with a V-shaped notch or recess 8, the part 7 being cut away or beveled underneath, as shown at 9, whereby a relatively sharp edge 10 is formed around the notch, which condition increases the gripping capacity when the device is used in connection with a pipe 12. The body of the device is provided with two depending lugs or ears 13 which are separated, as best illustrated in Fig. 3, leaving a space between them for the pipe when the latter is in place. These lugs 13 are provided with openings adapted to receive a bolt or pin 14, one extremity of which is provided with a head 15, while the opposite extremity is threaded, as shown at 16, to receive a nut 17. The shank of the bolt adjacent to the head is formed square or polygonal in cross section, as shown at 18, whereby it is adapted to fit the opening formed in one of the lugs, the said opening being of counterpart shape to prevent the pin from turning when the device is in use. The body of the device tapers, or is reduced in width from the part 7 toward its rear extremity 19, which is provided with an upwardly projecting ear or lug 20 having an opening 21 adapted to be connected with one extremity of a rope or cable 22.

When the device is in use it may be assumed that its rear extremity is connected with a rope or cable, as shown in Figs. 1 and 2. It may also be assumed that the pin 14 is removed from the lugs 13. The pipe 12 to be handled is then passed between the lugs 13 and caused to enter the V-shaped notch or recess 8. The pin is then inserted in the openings of the lugs 13 in front of the pipe. Then, as power is applied to the cable sufficient for lifting or lowering the pipe, the clutch will grip the latter, since its V-shaped portion will engage it on one side while the pin grips the pipe on the opposite side, the holding power of the clutch being sufficient to prevent slipping.

It is evident that my improved device may be formed of various sizes, depending upon the diameter of the pipe to be handled.

It will, of course, be understood that it is not necessary, in order to connect the clutch with a pipe, to remove the pin, since the pipe may, if desired, be inserted endwise between the pin and the notched member of the clutch. If, however, it is desired to connect the clutch with the pipe intermediate the extremities of the latter, it will, of course, be necessary to remove the pin, as heretofore explained.

Having thus described my invention, what I claim is:

1. A device of the class described, comprising a body member, consisting of a plate having a forwardly located V-shaped pipe-receiving recess or notch, the plate being tapered on the under side toward the notch so as to form an acute angle with the pipe when applied thereto, the plate being provided with depending separated members protruding beyond the body member at an angle thereto, and a removable pin passed through the said members at their lower extremities and coöperating with the recess above the same for clutching purposes, substantially as described.

2. A device of the class described, comprising an integral body member having a forwardly located V-shaped pipe-receiving recess or notch, the body member being tapered on the under side toward the notch, and provided with depending separated members protruding beyond the body part at an angle thereto, and a removable pin or bolt passed through the said depending members at their lower extremities and coöperating with the recess above the same for clutching purposes, substantially as described.

In testimony whereof I affix my signature in presence of two witnesses.

ROCHUS SCHOPF.

Witnesses:
ALICE I. LAKIN,
A. EBERT O'BRIEN.

---

Copies of this patent may be obtained for five cents each, by addressing the "Commissioner of Patents, Washington, D. C."